United States Patent [19]
Gerlach et al.

[11] 3,742,249
[45] June 26, 1973

[54] CIRCUIT FOR PHASE COMPARISON

[75] Inventors: Albrecht Gerlach, Emmendingen; Rolf-Dieter Burth, Windenreute, both of Germany

[73] Assignee: ITT Industries, Inc., New York, N.Y.

[22] Filed: Mar. 10, 1971

[21] Appl. No.: 122,897

[30] Foreign Application Priority Data
Mar. 26, 1970 Germany .................. P 20 14 692.3

[52] U.S. Cl. ................ 307/232, 307/235, 307/269, 330/30 D
[51] Int. Cl. ........................................ H03k 5/20
[58] Field of Search .................. 307/232, 235, 269; 328/63, 72, 133, 134, 146; 330/30 D

[56] References Cited
UNITED STATES PATENTS

| | | | |
|---|---|---|---|
| 3,475,622 | 10/1969 | Andersen et al. | 328/146 X |
| 3,309,618 | 3/1967 | Harris et al. | 330/30 D |
| 3,337,814 | 8/1967 | Brase et al. | 328/134 X |
| 3,610,955 | 10/1971 | Blaser | 328/146 X |
| 3,241,078 | 3/1966 | Jones | 329/50 |
| 2,927,279 | 3/1960 | Smith-Vaniz, Jr. | 328/146 X |
| 3,073,972 | 1/1963 | Jenkins | 307/232 |
| 3,315,089 | 4/1967 | Mayne | 330/30 D |
| 3,512,096 | 5/1970 | Nagata et al. | 330/30 D |
| 3,597,631 | 8/1971 | Fathauer | 328/146 X |

*Primary Examiner*—Stanley D. Miller, Jr.
*Attorney*—C. Cornell Remsen, Jr., Walter J. Baum, Paul W. Hemminger, Charles L. Johnsons, Jr., Philip M. Bolton, Isidore Togut, Edward Goldberg and Menotti J. Lombardi, Jr.

[57] ABSTRACT

An apparatus and method for phase comparison wherein a local oscillator generates a delta voltage containing a D.C. component. The delta voltage is compared with a threshold voltage derived from the delta voltage, resulting in a control signal the polarity of which depends on the outcome of the comparison. This control signal sets the frequency of the local oscillator.

4 Claims, 8 Drawing Figures

INVENTORS
ALBRECHT GERLACH
ROLF-DIETER BURTH

BY Vincent Dongrassia
AGENT

INVENTORS
ALBRECHT GERLACH
ROLF-DIETER BURTH
BY Vincent Ingrassia
AGENT

INVENTORS
ALBRECHT GERLACH
ROLF-DIETER BURTH
BY Vincent Ingrassia
AGENT

CIRCUIT FOR PHASE COMPARISON

BACKGROUND OF THE INVENTION

The present invention relates to a phase comparison method and circuit for deriving a setting signal for synchronizing two pulse sequences which are generated by a local oscillator and by an external oscillator.

Whenever it is the problem to realize conventional circuit arrangements serving the phase comparison, in the form of monolithically integrated circuits, considerable difficulties are encountered. This is due to the special technology relating to monolithically integrated semiconductor circuits which place restricting demands on the circuit engineer. It is impossible, in particular, to integrate inductances monolithically. Moreover, only relatively small capacitance values can be realized monolithically in the order of 10 $\mu\mu$. It, therefore, is a main problem of the circuit engineer dealing with the monolithic integration, to invent circuits and methods without inductances and capacitances.

SUMMARY OF THE INVENTION

It is an object of the present invention to provide a phase comparison method which can be realized with a monolithically integrated semiconductor circuit.

It is a further object of the invention to provide said integrable circuit itself.

According to a broad aspect there is provided a phase comparator circuit for synchronizing two pulse sequences, first means for receiving a first sequence of pulses, second means for receiving a delta voltage containing a D.C. voltage component, means for generating a voltage threshold level corresponding to said delta voltage, means for comparing a momentary value of said delta voltage with said voltage threshold level, and a second means for generating a control signal of one polarity when said momentary value is higher than said voltage threshold level, and of an opposite polarity when said momentary value is less than said voltage threshold level.

The above and other objects of the present invention will be better understood from the following detailed description taken in conjunction with the accompanying drawings, in which:

BRIEF DESCRIPTION OF THE DRAWINGS

FIG. shows the basic circuit diagram of the inventive type of circuit arrangement.

DESCRIPTION OF THE PREFERRED EMBODIMENTS

Figure 1:
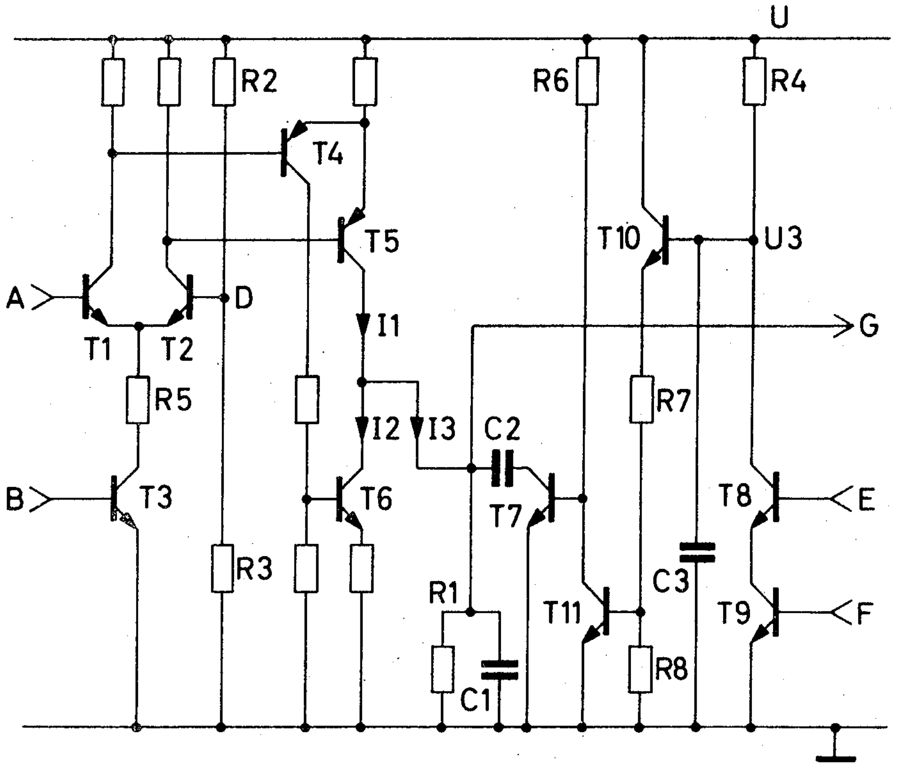

The phase-comparison and synchronizing circuit according to FIG. 1 consists of a symmetrical differential amplifier which is constituted by the transistors T1 and T2. In the emitter circuit which is common to both transistors T1 and T2, there is arranged the additional transistor T3, with the collector-emitter path thereof being positioned between the two emitters which are connected to one another, and the circuit zero, by inserting the resistor R5, if so required.

The collectors of the two transistors T1 and T2 form the output of the differential amplifier. To each collector there is connected one current source each which are constituted by the transistors T5 and T6. These two transistors are complementary in relation to one another, and are in such a way series-connected with their collector-emitter paths, that the two collectors are connected to one another. The current source including the transistor T6, which is assigned to the transistor T1 of the differential amplifier, is connected to the differential amplifier via a phase inverter which is constituted by the transistor T4, being complementary to the transistor T6 of the associated current source.

The common collector terminal of the two transistors T5 and T6 consisting the two current sources, is connected to the one terminal of the parallel circuit composed of the resistor R1 and of the capacitor C1, whereas the other terminal of this parallel arrangement is applied to circuit zero.

Moreover, the capacitor C2 is connected to the common collector point of the two transistors T5 and T6, with the other terminal thereof being connected to the collector of the switching transistor T7. The emitter of this switching transistor T7 is connected to circuit zero, while its base is connected to the collector of transistor T11 serving as phase inverter. The emitter of transistor T11 is connected to circuit zero, and the collector is applied to the supply voltage U across the operating resistor R6. The base of transistor T11 is applied to the tapping point of the voltage divider consisting of the voltage-dividing resistors R7 and R8 in the emitter circuit of transistor T10 serving as emitter follower.

From the base of the emitter-follower transistor T10, the storage capacitor C3 extends to circuit zero. Moreover, the base of transistor T10 is connected to the operating resistor R4 of the coincidence stage as constituted by the transistors T8 and T9. These two transistors, with their collector-emitter paths, are connected directly in series, so that the emitter of transistor T9 is applied to circuit zero, and the collector of transistor T8 is applied to both the operating resistor R4 and the base of transistor T10.

During the properly intended operation of the circuit arrangement shown in FIG. 1 as a phase-comparison stage, the delta voltage to be employed is fed to the input A of the differential amplifier. To the input B as connected to the base of the additional transistor T3, there are applied the pulses as generated by the external oscillator. As such pulses it is possible, for example, to use the synchronizing pulses as contained in the video signal of conventional types of television receivers.

The other input D of the differential amplifier is connected to the tapping point of the voltage divider consisting of the voltage-dividing resistors R2 and R3, with this voltage divider, in turn, being applied to operating voltage. The value of the DC-voltage as taken off the voltage divider, and applied to input D, may preferably correspond to the mean value resulting from the maximum and the minimum value of the delta voltage. The base of transistor T8 of the coincidence stage is connected to the input E to which, just like to the input B, there are fed the pulses generated by the external oscillator. The input F as connected to the base of transistor T9 of the coincidence stage, is supplied with a rectangular voltage as derived from the delta-voltage.

The voltage serving to synchronize the local (receiver) oscillator is taken off the output G which is connected to the filter circuit, hence to the connecting point common to both of the capacitors C1, C2 and the resistor R1.

The mode of operation of the inventive type of circuit arrangement will now be explained with reference to the voltage and current waveform characteristics shown in FIGS. 2 and 3. In FIGS. 2*a* to 2*e* the solid-line curves are indicative of the conditions prevailing at a synchronized local oscillator, whereas the dash-lined curves indicate the conditions prevailing at a non-synchronized local oscillator, i.e. in the present case, at a local oscillator oscillating too slow.

Figures 2A, 2B, 2C, 2D, 2E:
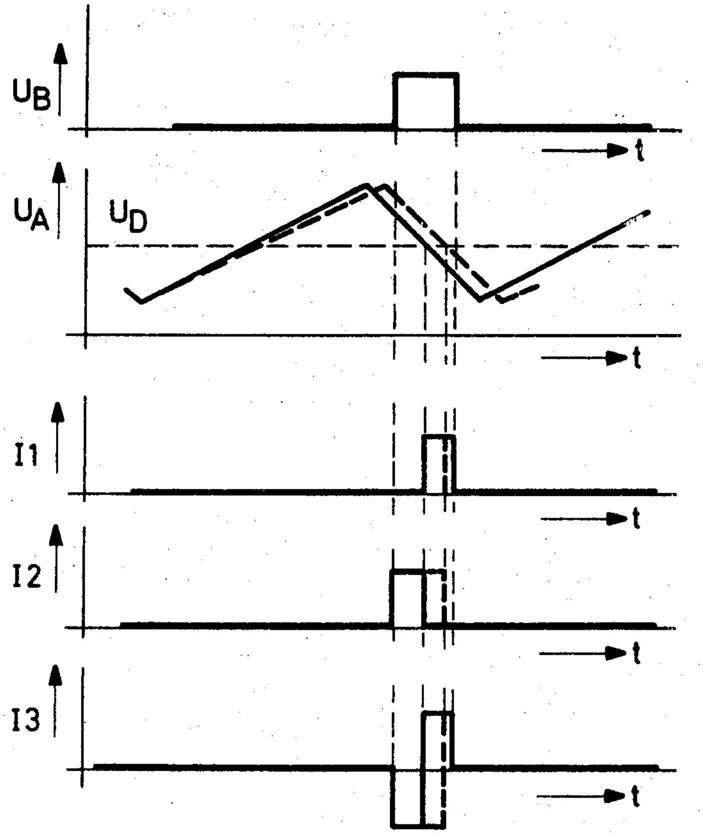
FIGS. 2*a* to 2*e*, as a function of time show different characteristics relating to the current and voltage waveforms as appearing at the corresponding points in the circuit according to FIG. 1, and FIGS. 3*a* and 3*b* show the voltage waveform as appearing at the storage capacitor in both the synchronous and asynchronous state.

FIG. 2*a* shows the external oscillator voltage $U_B$ as a function of time, as is applied to inputs B and E of the inventive type of circuit arrangement.

In FIG. 2*b* the voltage $U_A$ of the local oscillator is plotted as a function of time, hence being the shape of the delta voltage.

FIG. 2*c* shows the curve, as a function of time, of the current I1 flowing in the collector lead of transistor T5, whereas FIG. 2*d* shows the curve of current I2 flowing in the collector lead of transistor T6. FIG. 2*e*, finally, shows the curve of current I3 flowing towards the filter circuit.

Owing to the inventive arrangement of transistors T5 and T6 constituting the two current sources, in conjunction with the phase inverter T4 and the differential amplifier consisting of the transistors T1 and T2, the two current sources operate alternatingly, that is, there either only flows the current I1, or only the current I2.

For explanatory reasons it will now be assumed that the local oscillator is synchronized by the external-oscillator pulses which, as already mentioned hereinbefore, correspond to the solid-line curves shown in FIG. 2. Under this assumption the center of the external-oscillator pulse according to FIG. 2*a* coincides with the point of intersection as constituted by the descending portion of the delta voltage and of voltage $U_D$ as applied to the base of transistor T2 of the differential amplifier, that is, until both input voltages of the differential amplifier are equally large. During the first half of the external-oscillator pulse, therefore, the current pulse I2 will be flowing in the current-source transistor T6. During the second half of the external-oscillator pulse, however, there is switched on the current-source transistor T5, so that now the current pulse I1 will be flowing. The difference between these two current pulses will result in the double current pulse I3 whose time mean value equals zero. In this way, however, no control voltage will appear at the output G.

With reference to a synchronized local oscillator which is synchronized from a state of a local oscillator oscillating too slow, as illustrated in the present case, it will result that the current-source transistor T6 is switched on during a longer period of time of the external-oscillator pulse, namely up to the time position at which the descending portion of the delta voltage intersects with the DC voltage $U_D$, hence when both input voltages are equal.

From this time position onwards, there is then switched on the other current-source transistor T5. As the consequence of this there will result a double current pulse I3 whose negative pulse component is distinctly enlarged, so that a negative control voltage will appear at the filter circuit.

On the other hand, if the oscillation of the local oscillator was too quick, it will result that upon establishment of the synchronization, the control pulse I2 is distinctly shortened, so that there will result a current pulse I3 which will effect the charging of the filter capacitance, thus causing a positive control voltage to appear.

The control voltage appearing at the filter circuit is the higher the smaller the filter capacitance is. In the case of a constant control sensitivity at the control input of the local oscillator, therefore, the synchronizing range will be the greater, the smaller the filter capacitance is, in other words: the circuit arrangement is capable of correcting greater frequency deviations of the local oscillator, the smaller the filter capacitance is. On the other hand, however, insensitivity to interferences of the synchronized condition is only safeguarded in the case of a high filter capacitance. Accordingly, the low filter capacitance which is required for obtaining a sufficient synchronizing bandwidth, and the high filter capacitance which is necessary for effecting a low sensitivity to interferences in the synchronized state or condition, can only be achieved by switching over the filter capacitance.

For the purpose of effecting this switchover, there is provided the storage capacitor C3 which, on one hand, is charged across the operating resistor R4 and which, on the other hand, is discharged in the synchronized condition across the series-connected collector-emitter paths of transistors T8 and T9. This discharge is effected in the synchronous condition in that the rectangular pulse as derived from the delta voltage and applied to the input F, and the external oscillator pulse as applied to the input E, arrive simultaneously, thus simultaneously unblocking or driving the transistors T8 and T9 into saturation. Accordingly, in the synchronous condition, coincidence pulses are obtained periodically in the rhythm of the external-oscillator pulses, from which there will result the curve of voltage U3 as appearing at the storage capacitor C3, and shown in FIG. 3*a*.

In the asynchronous condition, however, not every external-oscillator pulse will lead to a discharge of the storage capacitor C3, so that the storage capacitor is capable of being recharged during the cycle of several external-oscillator pulses. If, in the course of this, the capacitor voltage U3 should exceed in voltage threshold level $U_S$, the transistor T11 of the phase inverter is rendered conductive, and the switching transistor T7 is rendered non-conductive, thus causing the capacitor C2 of high capacity, to be disconnected from the filter circuit, in other words: the parallel-connection of each of the capacitors C1 and C2 is eliminated.

Figure 3A:
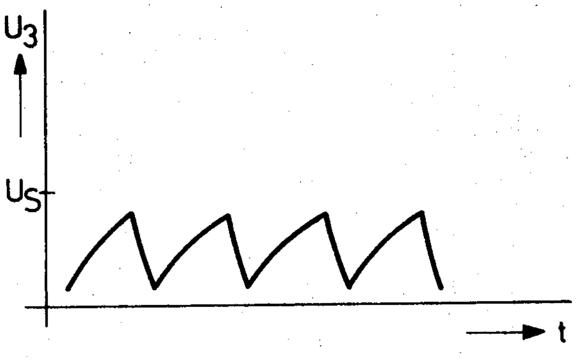
Figure 3B:
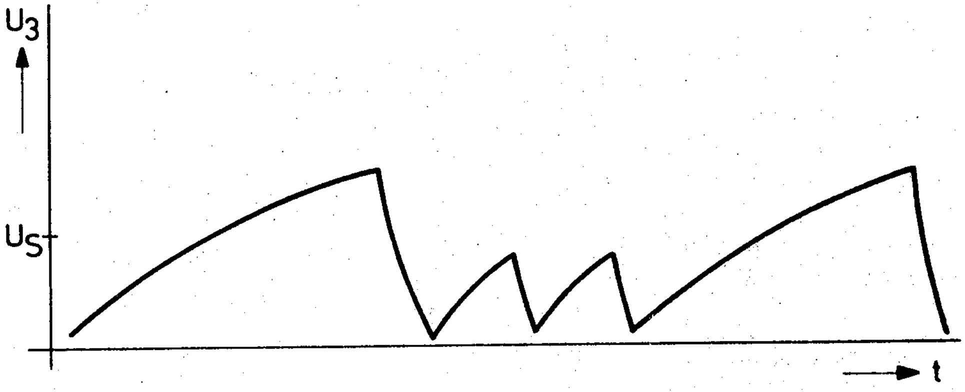

In FIG. 3*b* there is shown the curve relating to the voltage as appearing at the storage capacitor C3 with respect to the asynchronous condition and in the course of which, in distinction to the showing of FIG. 3*a*, groups of coincidence signals only appear in the rhythm of the difference frequency between the local-oscillator frequency and the external-oscillator frequency. The time constant of the RC-circuit R4, C3 is chosen in such a way in dependence upon the duration of the external-oscillator pulse which, in television receivers, usually amounts to about 5 $\mu$s, that the storage capacitor is already completely discharged by the short external-oscillator pulse, but is only recharged to the operating voltage level U after several periods of the delta voltage. Accordingly, in the synchronous condition, the voltage U3 at the storage capacitor cannot exceed the amplitude as shown, whereas this is actually possible in the case of an asynchronous operation, in the rhythm of the aforementioned difference frequency. Preferably, the time constant is about two to five times greater than the duration of periods of the delta voltage.

It is to be understood that the foregoing description of specific examples of this invention is made by way of example only and is not to be considered as a limitation on its scope.

We claim:

1. A phase comparator circuit for synchronizing two pulse sequences, comprising:
- a first means for receiving a first sequence of pulses;
- a source of supply voltage;
- means for deriving a voltage threshold level from said supply voltage;
- a differential amplifier having a first input coupled to a delta voltage and a second input coupled to said threshold voltage;
- first and second series connected constant current sources coupled to the output of said differential amplifier;
- a transistor coupled to the common-emitter circuit of said differential amplifier, the base of said transistor controlled by said first sequence of pulses; and
- means for generating a control signal of one polarity when the momentary value of said delta voltage is higher than said voltage threshold level, and of an opposite polarity when said momentary value is less than said threshold level.

2. A phase comparator circuit according to claim 1 further including a filter circuit coupled to said two constant current sources, said filter circuit having a time constant capable of being adjusted in dependence upon the degree of synchronization.

3. A phase comparator circuit according to claim 1 further including a phase inverter preceeding said two series connected constant current sources.

4. A phase comparator circuit according to claim 1 wherein each of said constant current sources includes one transistor arranged complementary to the other.

* * * * *